United States Patent [19]

Hayama

[11] 4,091,165
[45] May 23, 1978

[54] SURFACE PROCESSING COPOLYMER FOR SYNTHETIC PAPERS

[75] Inventor: Kazuhide Hayama, Yokkaichi, Japan

[73] Assignee: Mitsubishi Petrochemical Co., Ltd., Tokyo, Japan

[21] Appl. No.: 666,373

[22] Filed: Mar. 12, 1976

Related U.S. Application Data

[63] Continuation-in-part of Ser. No. 536,697, Dec. 26, 1974, abandoned, which is a continuation of Ser. No. 267,734, Jun. 29, 1972, abandoned.

[30] Foreign Application Priority Data

Jul. 1, 1971  Japan ................................. 46-48248
Mar. 13, 1975  Japan ................................. 50-29586

[51] Int. Cl.$^2$ ..................... C08F 18/22; D21H 5/00; B32B 27/30
[52] U.S. Cl. ..................... 428/409; 162/168 N; 428/265; 428/272; 428/515; 428/520; 428/522; 526/16
[58] Field of Search ............... 428/409, 265, 272, 515, 428/520, 522; 526/16; 162/168 N, 168 NA

[56] References Cited

U.S. PATENT DOCUMENTS

| | | | |
|---|---|---|---|
| 2,626,876 | 1/1953 | Carnes ................................. | 428/265 |
| 2,654,678 | 10/1953 | Cresswell ................................. | 428/265 X |
| 2,683,101 | 7/1954 | Riley et al. ................................. | 428/265 |
| 2,958,682 | 11/1960 | Schuller et al. ................................. | 526/46 |
| 2,977,341 | 3/1961 | Schuller et al. ................................. | 260/78 |
| 3,361,718 | 1/1968 | Fujimoto et al. ................................. | 260/49 |
| 3,395,134 | 7/1968 | D'Alelio ................................. | 526/292 |
| 3,689,470 | 9/1972 | Schachat et al. ................................. | 526/312 |
| 3,767,523 | 10/1973 | Schwarz ................................. | 428/520 X |
| 3,770,708 | 11/1973 | Knoepfel et al. ................................. | 526/304 |
| 3,968,306 | 7/1976 | Yoshihara et al. ................................. | 428/515 X |

*Primary Examiner*—Harold Ansher
*Attorney, Agent, or Firm*—Sughrue, Rothwell, Mion, Zinn and Macpeak

[57] ABSTRACT

An N-ampho-ionized copolymer treated with a monohaloacetic acid salt suitable for processing one or more surfaces of synthetic papers which imparts improved antistatic properties and printability to the synthetic papers, the copolymer comprising:

(1) a monomer represented by general formula (I):

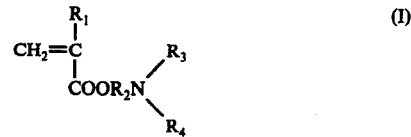

(2) a monomer represented by the general formula (II):

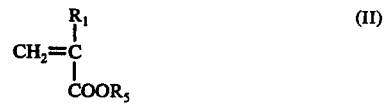

(3) a hydrophilic monomer (optional) and (4) a polymerizable hydrophobic vinyl monomer, is disclosed.

9 Claims, No Drawings

SURFACE PROCESSING COPOLYMER FOR SYNTHETIC PAPERS

CROSS-REFERENCE TO RELATED APPLICATION

This application is a continuation-in-part application of U.S. Patent Application Ser. No. 536,697 filed Dec. 26, 1974, now abandoned, which in turn is a continuation of application Ser. No. 267,734 filed June 29, 1972, also now abandoned, both of which were entitled "SURFACE PROCESSING COPOLYMER FOR SYNTHETIC PAPERS".

BACKGROUND OF THE INVENTION

1. Field of the Invention

The present invention relates to a surface processing copolymer for synthetic papers which provides the synthetic papers with excellent antistatic properties, printability, and other surface properties.

2. Description of the Prior Art

As a substitute for papers composed of intertwined natural cellulosic fibers, a synthetic paper using a synthetic resin as the substrate has now been developed. The synthetic paper is generally classified into a type of synthetic paper prepared by fabricating, into a sheet, fine fibers of a synthetic resin or a mixture of fine fibers of a synthetic resin and cellulosic fibers and a type of synthetic paper prepared by treating a synthetic resin film. The well known procedures for preparing the latter type of synthetic paper include a method in which a synthetic resin sheet is coated with an agent which provides a paper like feel to the sheet and a method in which a synthetic resin sheet itself is converted into an opaque paper-like sheet by, for example, stretching a synthetic resin film having incorporated therein a filler or by dissolving or swelling the surface of a soluble or swellable resin. Also, some synthetic paper has a laminate structure.

Such synthetic papers may be used in almost all of the purposes or fields in which conventional papers have been generally used but various disadvantages are usually associated with synthetic papers. That is, synthetic papers are not always satisfactory in antistatic properties, printability and other surface properties due to the employment of a synthetic resin as the substrate.

Presently, an antistatic agent is used for general synthetic resin articles as a means of eliminating such disadvantages as mentioned above. That is, the antistatic properties of synthetic resin articles are provided (1) by kneading in or coating on the synthetic resin articles a low molecular weight antistatic agent or (2) coating on the surfaces of the synthetic resin articles a high molecular weight antistatic agent.

It may, as a matter of course, be considered to apply such an antistatic agent to synthetic papers which are also used with synthetic resin articles but it is quite difficult by the application of such an antistatic agent to provide simultaneously the various properties required in the synthetic resin papers, such as antistatic properties, printability, other surface properties, etc., to the synthetic papers.

That is, an antistatic effect in synthetic papers may be obtained by method (1) referred to above but the antistatic effect is temporary and decreases or disappears by rubbing or with the passage of time. In particular, when such an antistatic agent is employed for synthetic papers, a printing ink bolts on the synthetic papers and the papers also are lacking in desired continuous offset printability. On the other hand, when the conventional high molecular weight surface active agent is applied to synthetic papers as indicated in method (2), the durability of the antistatic effect may be improved satisfactorily but the synthetic papers thus treated are still insufficient in heat resistance and printability.

In order to solve the above defects involved with the conventional prior art, the present inventor developed a synthetic paper treated with an N-amphoteric copolymer using as a starting monomer a zwitter-ionic (ampho-ionic) monomer and a hydrophobic monomer. Further, as an improvement thereon, the present inventor developed a surface processing composition for synthetic papers comprising an N-cationized copolymer which is obtained by using as a zwitter-ionizing agent an alkyl ester of a monohaloacetic acid (see Japanese Patent Application 54,717/1974).

The present invention is an improvement on the above mentioned surface processing agents for synthetic papers. That is, while the invention of Japanese Patent Application 54,717/1974 provides a satisfactory surface processing agent for synthetic papers, a cationic copolymer obtained using an alkyl ester of a monohaloacetic acid as a cationizing agent possesses a slight toxicity, and, as a result, the use thereof is limited. As a result of considering this point, the present inventor found that an excellent surface processing composition can be obtained by using a salt of a monohaloacetic acid instead of an alkyl ester of a monohaloacetic acid and also by limiting the alcohol portion ($R_5$) of the second component to a specific alkyl group, i.e., an alkyl group having 12 to 18 carbon atoms.

SUMMARY OF THE INVENTION

An object of this invention is, therefore, to provide a surface processing copolymer which is particularly useful for synthetic papers.

A further object of this invention is to provide a synthetic paper comprising a synthetic resin sheet having on at least one surface thereof a coating of a surface processing copolymer.

A still further object of this invention is to provide a synthetic paper unaccompanied by the aforesaid disadvantages.

Yet a further object of this invention is to provide a surface processing copolymer for synthetic papers which provides the synthetic papers with improved antistatic properties as well as excellent printability and other surface properties such as heat resistance.

The above objects of the present invention are attained by coating at least one surface of a synthetic resin film with an N-ampho-ionized copolymer treated with a monohaloacetic acid salt as a surface processing copolymer.

Thus, according to the present invention, there is provided an improved synthetic paper having coated on at least one surface thereof an N-ampho-ionized copolymer treated with a monohaloacetic acid salt, said copolymer comprising (1) about 25 to about 35% by weight of a monomer represented by general formula (I):

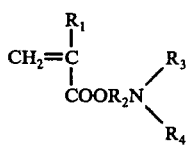

wherein $R_1$ is a hydrogen atom or a methyl group, $R_2$ is an alkylene group having 1 to 4 carbon atoms and $R_3$ and $R_4$ are each an alkyl group having 1 to 4 carbon atoms; (2) about 30 to about 45% by weight of a monomer represented by general formula (II):

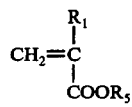

wherein $R_1$ is the same as defined above and $R_5$ is an alkyl group having 12 to 18 carbon atoms; (3) 0 to about 15% by weight of a hydrophilic monomer; and (4) the balance of the copolymer comprising a polymerizable hydrophobic monomer, where the total amount of components (1) and (3) is not less than about 30% by weight.

DETAILED DESCRIPTION OF THE INVENTION

Thus, the inventor has succeeded in remarkably improving the antistatic properties, the printability and other surface properties of a synthetic paper by processing the surface of the synthetic paper with a specific ionic copolymer (N-amphoteric compound). Although the reason is not presently fully understood why such an ionic copolymer provides remarkable effects on synthetic papers, without desiring to be bound thereby it is believed that the ionic group in the copolymer greatly contributes to the improvement in the drying property of ink on the paper, the affinity of ink to the surface of the paper, the adhesive property of the paper to the ink, and the antistatic properties.

That is, if the amount of component (1) which is the source for an ionic group is less than about 25% by weight, a sufficient antistatic effect is not obtained and the water solubility is not enough. On the other hand, if the amount exceeds about 35% by weight, continuous offset printing, specifically transferring of the second printing ink, becomes poor.

It is believed that component (2) provides remarkably excellent effects in improving blotting of ink, transfer of ink and adhesiveness. If the amount of component (2) is less than about 30% by weight, the transfer of ink becomes poor. Further, if it is greater than about 45% by weight, the ionic copolymer produced dissolves in water only with difficulty, thereby exhibiting poor workability and providing an uneven coating layer. It is not desirable to dissolve the ionic copolymer in an organic solvent to avoid the above disadvantages in view of the dangers of explosion and the toxic nature of most organic solvents. The reasons for limiting the number of carbon atoms in the alcohol portion of component (2) to 12 to 18 are that if the number of carbon atoms is smaller than 12, the transfer of the second printing ink in offset printing becomes poor, and if it is larger than 18, the copolymer itself dissolves in water only with difficulty.

Component (3) serves to control the solubility in water of the copolymer, and is effective for improving the adhesiveness of the copolymer to ink and synthetic papers. However, if the amount is larger than about 15% by weight, the ink transfer capability rapidly deteriorates. From the commercial viewpoint, an amount of from about 3 to about 10% by weight is preferred for component (3).

The amount of component (4) is not specifically limited, but about 5 to about 20% by weight is most preferred.

In the present invention, such an ionic copolymer is applied to the surface of a paper-like synthetic resin film rather than being kneaded into the synthetic resin film, since the kneading-in procedure is accompanied by the following disadvantages. (1) When an additive such as an antistatic agent is kneaded in a synthetic resin article, the additive exhibits its effect after it bleeds onto the surface of the article but, in this case, the extent of the bleeding must be properly controlled. In other words, if the additive bleeds excessively, the article, in particular, a synthetic resin film, suffers blocking, while if the extent of bleeding is low, the effect of the additive, e.g., the antistatic effect, is reduced. Moreover, it is quite difficult to control the blocking preventing effect and the antistatic effect. (2) Also, additives such as an antistatic agent bled onto the surface of a synthetic resin article cause blotting of ink, and, further, because the amount of the additive bled on the surface thereof varies with tha passage of time, it is difficult to obtain prints having constant quality from synthetic papers containing the kneaded additive. (3) A typical example of the synthetic resin type paper-like films is an oriented synthetic resin film containing a fine filler, but, in the case of oriented or stretched films, in particular a biaxially stretched synthetic resin film, the additive cannot be distributed uniformly throughout the article even though the additive is added before stretching. To overcome this difficulty, the synthetic resin film is subjected to annealing after stretching, but, in the case of a synthetic paper, the annealing operation causes wrinkles or slacks, which makes the synthetic paper unsuitable for offset printing. Also, as a matter of course, the employment of the annealing step increases the cost of the papers. (4) Furthermore, in the case of a synthetic resin film containing a fine filler, the additive kneaded in the synthetic resin film is adsorbed by the filler and thus a large amount of the additive is required in order to secure a sufficient extent of bleeding, for example, in an amount of approximately 2 to 3% by weight on the basis of the total weight of the synthetic resin and the filler.

In the present invention, the various paper-like films described above can be used as the synthetic resin paper-like films. One of the typical examples of such synthetic resin paper-like films is that disclosed in the specification of British Pat. No. 1268823. The paper-like sheet disclosed therein has a laminate structure composed of a uniaxially stretched synthetic resin film containing from about 30 to 50% by weight of a fine filler and at least one biaxially stretched synthetic resin film containing from about 0 to 10% by weight of a fine filler. The uniaxially stretched film of the laminate exhibits excellent paper-like properties due to the fine cells or pores formed by stretching the film after blending the fine filler therein. The synthetic resin used in this laminate may be any one of the known resins depending on the purposes, but examples of the most preferable synthetic resins are polyethylene, polypropylene, a poly(ethylene/propylene), polystyrene, and mixtures thereof.

Other examples of the paper-like synthetic resin films used in this invention are an unstretched synthetic resin film containing a fine filler, a polystyrene film having dispersed therein fine particles of a rubbery polymer, a whitened synthetic resin film treated by a swelling agent for polystyrene, a synthetic resin film coated with an agent providing a paper-like feel such as a fine solid powder, and a synthetic resin sheet prepared from fine fibers of a synthetic resin.

As described above, component (1) used for the production of the copolymer of the present invention, which is used in a surface processing composition for synthetic papers, is a monomer represented by general formula (I):

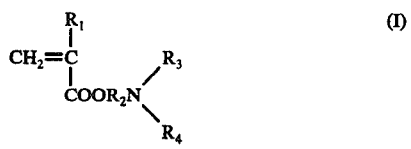

wherein $R_1$ is a hydrogen atom or a methyl group, $R_2$ is an alkylene group having 1 to 4 carbon atoms, and $R_3$ and $R_4$ are each an alkyl group having 1 to 4 carbon atoms.

Preferred examples of component (1) include dimethylaminoethyl methacrylate, diethylaminoethyl methacrylate, diethylaminoethyl acrylate, dibutylaminoethyl methacrylate, dibutylaminopropyl methacrylate, etc. The monomer wherein $R_2$ is an ethylene group is specifically preferred.

Component (2) is a monomer represented by general formula (II):

wherein $R_1$ is the same as defined above, and $R_5$ is an alkyl group having 12 to 18 carbon atoms.

Examples of component (2) monomers include dodecyl methacrylate, tridecyl methacrylate, myristyl methacrylate, hexadecyl methacrylate, stearyl methacrylate, etc.

Component (3) is a hydrophilic monomer having a solubility at 20° C of at least about 5% by weight.

Preferred examples of the hydrophilic monomer [component (3)] include hydroxyethyl methacrylate, hydroxyethyl acrylate, hydroxypropyl acrylate, N-vinyl pyrrolidone, acrylic or methacrylic acid or alkali metal salts thereof, ammonium salts thereof, amine salts thereof, or acid-amide of the acids, etc.

Component (4) is a polymerizable hydrophobic vinyl monomer which, of course, differs from any of components (1) to (3) and which is insoluble or sparingly soluble in water.

Preferred examples of such hydrophobic monomers include styrene; a nucleus-substituted and/or side chain-substituted derivative of styrene, such as vinyl toluene, chlorostyrene, and α-methylstyrene; an acrylic or methacrylic acid ester in which the alcohol portion is a saturated or unsaturated alkyl group or is cyclohexyl group.

The above monomers for each component can be used as a mixture, if desired, so that each "component" will be present as a mixture of monomers.

The proportion of each component in the copolymer is determined so that component (1) is present in an amount of from about 25 to about 35% by weight, component (2) is present in an amount of from about 30 to about 45% by weight, component (3) is present in an amount of from 0 to about 15% by weight and the balance of the copolymer is component (4), the total amount of components (1) and (3) being at least about 30% by weight.

The zwitter-ionizing agent used for obtaining a surface processing copolymer for synthetic papers in accordance with this invention is a monohaloacetic acid salt, preferably a monochloroacetate of an alkali metal, an alkaline earth metal or an organic amine, which reacts with a nitrogen atom in the above monomers or the copolymer obtained therefrom. The agent is used in a form of an aqueous solution or a water-alcohol solvent thereof.

The copolymerization itself can be effected in any conventional manner such as using an emulsion polymerization, a solution polymerization, a suspension polymerization, a bulk polymerization, and the like.

The ionic copolymer is prepared using the above described components as starting materials and by the copolymerization and zwitter-ionization thereof. The order of copolymerization and zwitter-ionization is optional, but if the zwitter-ionization is conducted first, the ionization is conducted only on the nitrogen atom-containing monomers.

It should thus be understood that the final product (N-ampho-ionized copolymer) of the present invention is basically prepared in the following two preferred manners:

(a) a copolymer is prepared by the copolymerization of components (1) to (4) and then the copolymer prepared is ionized (reacted) with an ionizing agent (monohaloacetic acid salt), in which the agent selectively reacts with N atom of the copolymer;

(b) component (1) is reacted with an ionizing agent to prepare a zwitter-ionic monomer, and the zwitter-ionic monomer plus components (2) to (4) are polymerized to prepare the final N-ampho-ionized copolymer.

The term "treated" as used herein includes the above two embodiments. In view of its practical value, embodiment (a) is preferred.

Specific embodiments of the production of the ionic copolymer used in this invention will be illustrated hereinafter.

(I) Zwitter-ionization in aqueous solution and emulsion polymerization with hydrophobic monomer:

(a) Zwitter-ionization in aqueous solution:

The monomer represented by the following formula:

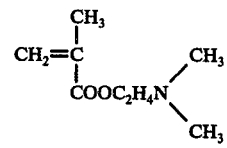

is mixed with $ClCH_2COONa$ (prepared by neutralizing $ClCH_2COOH$ with NaOH in an aqueous solution) and then they are reacted for about 3 hours at temperatures of 60° to 70° C in the presence of a polymerization preventing agent, such as monoethyl hydroquinone, in an amount of 200 to 500 ppm/part of monomer.

(b) Emulsion polymerization with hydrophobic monomer:

A hydrophobic monomer (for example, the compound of the formula:

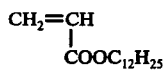

is emulsified in an aqueous solution using an emulsifier and after adding thereto the zwitter-ionic monomer prepared above, the copolymerization is conducted at a temperature of 70° to 80° C while adding dropwise an aqueous solution of potassium persulfate.

(II) Emulsion copolymerization and zwitter-ionization:

(a) Emulsion copolymerization:

A monomer having, e.g., the following formula:

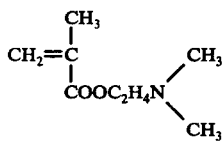

and a monomer having, e.g., the following formula:

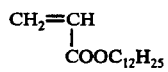

are subjected to an emulsion polymerization in the presence of an emulsifier using potassium persulfate.

(b) Zwitter-ionization:

ClCH$_2$COONa is added to the emulsion prepared above in an equimolar amount to the amount of the monomer of:

$$\begin{array}{c} CH_3 \\ | \\ CH_2=C \\ | \\ COOC_2H_4N \diagup CH_3 \\ \diagdown CH_3 \end{array}$$

and the zwitter-ionization is conducted at a temperature of 80° to 90° C.

(III) Zwitter-ionization in water-ethanol and solution polymerization:

(a) Zwitter-ionization in water-ethanol solvent system:

The zwitter-ionization is conducted in the same manner as in the above method (I).

(b) Solution polymerization:

The monomer prepared in the above step (a) and the monomer having the formula:

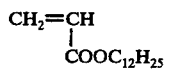

and dissolved in ethanol and then the solution polymerization is conducted using azo-bis-isobutyronitrile as a catalyst. Thereafter, water is replaced with ethanol.

(IV) Solution polymerization and zwitter-ionization:

(a) Solution polymerization:

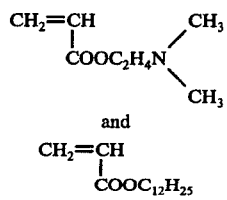

are subjected to a solution polymerization in ethanol using azo-bis-isobutyronitrile.

(b) Zwitter-ionization:

An aqueous solution of ClCH$_2$COONa is added to the polymer prepared above to conduct the zwitter-ionization. Thereafter, ethanol is replaced with water.

The ionic copolymer prepared by one of the previously described methods is applied to the surface of the paper-like synthetic resin film described above by any one of the procedures commonly employed by those skilled in the art.

Generally, the application of the ionic copolymer may be carried out by applying a solution or an emulsion of the ionic copolymer to at least one surface, preferably both surfaces, of the paper-like synthetic resin film, and then removing the solvent or dispersing medium used, for example, by evaporation. In this case, it is preferable that the solvent or the dispersing medium be inert to the materials constituting the paper-like synthetic resin film, in particular, to the synthetic resin, but a solvent or medium which causes only a slight swelling of the paper-like film may be used. From the viewpoint of operating sanitation and safety, an aqueous solvent or an aqueous emulsion is most preferred. In this case, an organic solvent such as a solvent used for the polymerization step is sometimes present in an amount of less than about 5% by weight, generally about 2 to about 3% by weight, but there is no specific limitation on the amount of solvent present.

If necessary, the ionic copolymer is applied to the paper-like synthetic resin film using melt coating.

The surface processing polymer used in this invention may contain a filler, and, if necessary, other additives such as a stabilizer, a coloring matter, etc.

The amount of the surface processing copolymer can be varied depending upon the effects desired but in general is about 0.1 to 1% by weight based on the weight of the synthetic paper.

The present invention is further illustrated in greater detail by the following examples, but they are not to be construed as limiting the scope of the invention. All parts and percentages given herein are by weight unless otherwise indicated.

EXAMPLE 1

In 200 parts by weight of isopropanol were dissolved 40 parts of the monomer having the formula:

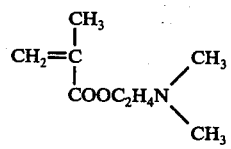

40 parts of the monomer having the formula:

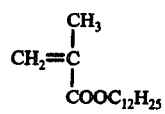

and 20 parts by weight of the monomer having the formula:

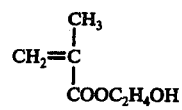

and after adding to the resulting solution a solution of 0.6 part by weight of azo-bis-isobutyronitrile in 50 parts by weight of isopropanol, they were copolymerized for 8 hours at 70° C. A solution of 28 parts by weight of sodium monochloroacetate in 300 parts by weight of water was then added to the polymerization product and the zwitter-ionization was conducted for 4 hours while removing the isopropanol at 80° to 90° C. The aqueous solution was dissolved in water in an amount sufficient to make a 2% solid content and the resulting solution was applied to the surfaces of a synthetic resin film by means of a roll coater.

The various properties of the synthetic papers thus prepared were evaluated, the results of which are shown in the following table together with the results of evaluation with respect to the use of conventional processing agents. As is clear from the results contained in the table, the ionic copolymer prepared above was found to be an excellent surface processing material for synthetic papers as compared with conventional processing agents.

The paper-like synthetic resin film used in this example was a laminate of stretched polypropylene film containing a filler in an amount of 42% by weight relative to the total weight of the film.

The results obtained are shown in Table 1 below.

TABLE 1

| Antistatic Agent | Antistatic Properties | | Blotting | Offset printing | | | | Substrate Adhesion | Heat Resistance |
| | Quick Effect | Durability | | Continuous Operation | Transferring of Ink | Adhesive Property | Drying Property | | |
|---|---|---|---|---|---|---|---|---|---|
| Conventional processing agents | | | | | | | | | |
| Molecular type antistatic agent for kneading-in | x | Δ | Δ | Δ | Δ | | | | |
| Molecular type antistatic agent for surface coating | | | | | | | | | |
|   nonionic | Δ | x | x | x | Δ | | | | |
|   anionic | Δ | x | x | x | Δ | | | | |
|   cationic | o | x | x | x | Δ | | | | |
|   zwitter-ionic | o | x | x | x | Δ | | | | |
| Polymer type antistatic agent for surface coating | | | | | | | | | |
|   nonionic | Δ⁻ | o | o | Δ—x | Δ | | Δ | Δ | o |
|   anionic | Δ⁺ | o | o | Δ—x | Δ | | Δ | Δ | Δ |
|   cationic | o | o | o | Δ—x | Δ | | Δ | Δ | x |
| Hydrophobic vinyl polymer | x | x | o | o | | | Δ | x | |
| Novel processing agent (zwitter monomer + hydrophobic monomer copolymer) | o | o | o | o | o | o | o | o | o |
| General paper | | | | | | | | | |
|   Coated paper | o | o | o | o | o | o | o | | |

(Note)
1. The conventional processing agents used in the example and shown in the above table were as follows:

| Description in Table | Typical Structure and/or Trade Name |
|---|---|
| Molecular type antistatic agent for kneading-in | Polyoxyethylamine<br>RN<(EO)ₙH / (EO)ₙH |
| Polymer type antistatic agent for coating | |
|   nonionic | Poval, polyethylene glycol |
|   anionic | Sodium polyacrylate |
|   cationic | Polydimethylaminoethyl methacrylate and quaternary product |
|   zwitter-ionic | Betaine-type polyacrylate |
| Molecular type antistatic agent for coating | |
|   nonionic | Polyoxyethylene alkyl phenol |
|   anionic | Alkylphosphoric acid ester, alkyl sulfate |
|   cationic | Alkylamine salt, alkyl quaternary ammonium salt |
|   zwitter-ionic | Alkylbetaine-type |
| Hydrophobic vinyl | Acrylic acid ester |

TABLE 1-continued polymer
2. Evaluation Standards:
(1) Antistatic property:
o: no difficulty (showing same operability as conventional paper)
Δ: some difficulty at printing-difficulty happened at the supply and withdraw of the synthetic papers
x: difficult printing operation
(2) Blotting of ink:
o: no difficulty
Δ: blot occurred when a large amount of water was used
x: blot occurred regardless of the amount of water used
(3) Durability of offset printing (the transferring property of ink when the offset printing was applied continuously):
o: no difficulty
Δ: the transferring property of ink was slightly poor in accordance with the amount of water used
x: the transferring property of ink was poor regardless of the amount of water used
Evaluation procedure: made visually and optically by the Hunter Method (Testing Methods for Brightness of Paper and Pulp)
(4) Adhesive property of ink and to the base material:
o: no difficulty
Δ: slightly poor
x: poor
Evaluation procedure: after adhering an adhesive tape to the synthetic paper having printed ink thereon, the tape was stripped at a definite speed and the state of the ink attached to the tape was observed
(5) Drying property of ink:
o: no difficulty
Δ: slightly low drying speed
x: low drying speed
Evaluation procedure: the change in the viscosity of ink with the passage of time was measured
(6) Heat resistance:
o: the increase in the melt index as well as the generation of odor and the coloring of the resin itself were not detected when the copolymer was reclaimed
Δ: above changes were noted slightly
x: above changes were noted significantly

EXAMPLE 2

30 parts of dimethylaminoethyl methacrylate, 30 parts of stearyl methacrylate, 20 parts of cyclohexyl methacrylate, 20 parts of ethyl acrylate, 100 parts of ethyl cellosolve (solvent) and 0.6 part of azo-bis-isobutyronitrile were introduced into a four-necked flask having a stirrer, a condenser and an N$_2$-introducing pipe. After replacing the reaction atmosphere with nitrogen gas, the reaction system was elevated to a temperature of 80° C and copolymerization was conducted for 3 hours. After adding a solution prepared by dissolving 18.5 parts of sodium monochloroacetate in 20 parts of water to the mixture, the copolymerization was further continued at 80° C for 3 hours.

The copolymer prepared was dissolved in water in an amount sufficient to make a 20% aqueous solution and the resulting solution was applied to the surfaces of a paper-like synthetic resin film as was used in Example 1.

EXAMPLES 3 – 23 & COMPARATIVE EXAMPLES 1 – 18

The same procedure as in Example 2 was followed, using the monomers shown in Table 2 below with the exception that in Examples 4 to 23 and Comparative Examples 3 to 18 a 1.5% aqueous solution of the copolymer was used.

The properties of the synthetic papers obtained in Examples 2 to 23 and Comparative Examples 1 to 17 are shown in Table 3 below.

TABLE 2

(The numeral indicate parts by weight of the component)

| Example (or Comparative Example, Comparative Examples being indicated by a numeral in parentheses) No. | DM | DE | DB | DMP | DMA | C₁₂ | C₁₄ | C₁₆ | C₁₈ | HEMA | AAmide | MAA | AA | EMA | ABE | DCH | 2-EHMA | NVP |
|---|---|---|---|---|---|---|---|---|---|---|---|---|---|---|---|---|---|---|
| 2    | 30 |    |    |    |    |    |    |    | 30 |    |    |    |    |    | 20 | 20 |    |    |
| (1)  | 30 |    |    |    |    |    |    |    | 25 |    |    |    |    |    | 15 | 30 |    |    |
| 3    | 35 |    |    |    |    |    |    |    | 45 |    |    |    |    |    |    | 20 |    |    |
| (2)  | 38 |    |    |    |    |    |    |    | 40 |    |    |    |    |    |    | 22 |    |    |
| (3)  | 40 |    |    |    |    |    |    |    | 45 |    |    |    |    |    |    | 15 |    |    |
| 4    | 25 |    |    |    |    |    |    |    | 45 | 3  |    |    |    |    | 22 |    |    |    |
| (4)  | 30 |    |    |    |    |    |    |    | 30 | 10 |    |    |    |    | 10 | 20 |    |    |
| 5    | 30 |    |    |    |    |    |    |    | 25 | 5  |    |    |    |    | 10 | 30 |    |    |
| (5)  | 30 |    |    |    |    |    |    |    | 50 | 10 |    |    |    |    |    |    |    |    |
| (6)  | 30 |    |    |    |    |    |    |    | 50 | 15 |    |    |    |    | 5  |    |    |    |
| (7)  | 35 |    |    |    |    |    |    |    | 40 | 5  |    |    |    |    |    | 20 |    |    |
| 6    | 35 |    |    |    |    |    |    |    | 20 | 10 |    |    |    |    |    | 40 |    |    |
| (8)  | 35 |    |    |    |    |    |    |    | 40 | 5  |    |    |    |    |    | 15 |    |    |
| (9)  | 40 |    |    |    |    |    |    |    | 45 |    |    |    |    |    |    | 20 |    |    |
| 7    | 30 | 30 |    |    |    |    |    |    | 35 |    |    |    |    |    | 5  | 20 |    |    |
| 8    | 30 |    | 30 |    |    |    |    |    | 35 |    |    |    |    |    | 5  | 20 |    |    |
| 9    | 30 |    |    | 30 |    |    |    |    | 35 |    |    |    |    |    | 5  | 20 |    |    |
| 10   | 30 |    |    |    | 30 |    |    |    | 35 |    |    |    |    |    | 5  | 20 |    |    |
| 11   | 30 |    |    |    |    | 30 |    |    | 35 |    |    |    |    |    | 5  | 20 |    |    |
| 12   | 30 |    |    |    |    |    | 35 |    | 35 |    |    |    |    |    | 5  | 20 |    |    |
| 13   | 30 |    |    |    |    |    |    | 35 | 35 |    |    |    |    |    | 5  | 20 |    |    |
| 14   | 30 |    |    |    |    |    |    |    | 35 |    | 10 |    |    |    | 5  | 20 |    |    |
| 15   | 30 |    |    |    |    |    |    |    | 35 |    |    | 5  |    |    | 12 | 20 |    |    |
| 16   | 30 |    |    |    |    |    |    |    | 35 |    |    |    | 5  |    | 5  | 25 |    |    |
| 17   | 30 |    |    |    |    |    |    |    | 35 |    |    |    |    | 10 | 10 | 20 |    |    |
| 18   | 35 |    |    |    |    | 30 |    |    |    | 10 |    |    |    |    |    | 15 | 20 |    |
| 19   | 35 |    |    |    |    |    |    | 35 |    | 5  |    |    |    |    |    | 20 |    |    |
| 20   | 35 |    |    |    |    |    |    | 35 |    | 5  |    |    |    |    |    | 20 |    |    |
| 21   | 30 |    |    |    |    |    |    |    | 35 | 10 |    |    |    |    |    | 20 |    |    |
| 22   | 35 |    |    |    |    | 10 |    |    | 30 | 5  |    |    |    |    |    | 20 |    |    |
| (10) | 35 |    |    |    |    |    |    |    |    | 5  |    |    |    |    |    |    | 50 | 10 |
| (11) | 35 |    |    |    |    |    |    |    |    | 5  |    |    |    |    |    |    | 50 | 10 |
| (12) | 30 |    |    |    |    | 30 |    |    |    |    |    |    |    |    |    |    | 30 | 5  |
| 23   | 35 |    |    |    |    |    |    |    |    |    |    |    |    |    |    | 30 | 25 | 10 |
| (13) | 30 |    |    |    |    |    |    |    |    |    |    |    |    |    |    | 20 | 77 | 10 |
| (14) | 23 |    |    |    |    |    |    |    |    |    |    |    |    |    |    |    | 50 | 10 |
| (15) | 15 |    |    |    |    |    |    |    |    |    |    |    |    |    |    | 35 | 50 | 10 |
| (16) | 8  |    |    |    |    |    |    | 42 |    |    |    |    |    |    |    |    |    |    |

TABLE 3

| Ex. (or Comparative Ex.)No. | Water Solubility | Antistatic Property | Continuous Operation | Transferring of Ink | Adhesive Properties | Total Evaluation |
|---|---|---|---|---|---|---|
| 2 | φ | o | o | o | o | o |
| (1) | φ | o | Δ | o | o | Δ |
| 3 | φ | o | o | o | o | o |
| (2) | o | o | Δ | o | o | Δ |
| (3) | o | o | x | Δ | o | x |
| (4) | x | Δ | o | o | o | x |
| 4 | o | o | o | o | o | o |
| (5) | o | o | x | Δ | o | x |
| (6) | x | o | o | o | o | x |
| (7) | Δ | o | o | o | o | Δ |
| 5 | o | o | o | o | o | o |
| (8) | o | o | x | Δ | o | x |
| 6 | o | o | o | o | o | o |
| (9) | o | o | x | Δ | o | x |
| 7 | o | o | o | o | o | o |
| 8 | o | o | o | o | o | o |
| 9 | o | o | o | o | o | o |
| 10 | o | o | o | o | o | o |
| 11 | o | o | o | o | o | o |
| 12 | o | o | o | o | o | o |
| 13 | o | o | Δ | o | o | o |
| 14 | o | o | o | o | o | o |
| 15 | o | o | o | o | o | o |
| 16 | o | o | o | o | o | o |
| 17 | o | o | o | o | o | o |
| 18 | o | o | o | o | o | o |
| 19 | o | o | o | o | o | o |
| 20 | o | o | o | o | o | o |
| 21 | o | o | o | o | o | o |
| 22 | o | o | o | o | o | o |
| (10) | o | o | x | Δ | o | x |
| (11) | o | o | x | Δ | o | x |
| (12) | o | o | Δ | Δ | o | Δ |
| (13) | o | o | x | Δ | o | x |
| 23 | o | o | o | o | o | o |
| (14) | o | o | Δ | o | o | Δ |
| (15) | x | Δ | Δ | o | o | x |
| (16) | x | x | Δ | o | o | x |
| (17) | x | x | Δ | o | o | x |

(Note): Abbreviation Used in Table 3

DM: Dimethylaminoethyl methacrylate $$CH=\underset{COOC_2H_4N(CH_3)_2}{\overset{CH_3}{C}}$$

DE: Diethylaminoethyl methacrylate $$CH=\underset{COOC_2H_4N(C_2H_5)_2}{\overset{CH_3}{C}}$$

DB: Dibutylaminoethyl methacrylate $$CH=\underset{COOC_2H_4N(C_4H_9)_2}{\overset{CH_3}{C}}$$

DMP: Dimethylaminopropyl methacrylate $$CH=\underset{COOC_3H_7N(CH_3)_2}{\overset{CH_3}{C}}$$

DMA: Dimethylaminoethyl acrylate $$CH_2=CH\underset{COOC_2H_4N(CH_3)_2}{}$$

$C_{12}$: Lauryl methacrylate

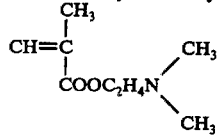

$C_{14}$: Myristyl methacrylate

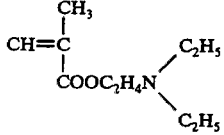

$C_{16}$: Hexadecyl methacrylate

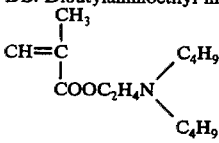

$C_{18}$: Stearyl methacrylate

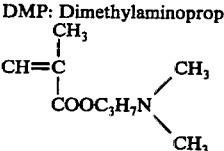

HEMA: Hydroxyethyl methacrylate $$CH_2=\underset{COOC_4OH}{\overset{CH_3}{C}}$$

AAmide: Acrylamide $$CH_2=CH\underset{COONH_2}{}$$

MAA: Methacrylic acid $$CH_2=\underset{COOH}{\overset{CH_3}{C}}$$

AA: Acrylic acid $$CH_2=CH\underset{COOH}{}$$

EMA: Ethylmethacrylate $$CH_2=\underset{COOC_2H_5}{\overset{CH_3}{C}}$$

AEE: Ethyl acrylate $$CH_2=CH\underset{COOC_2H_5}{}$$

D: Decylmethacrylate $$CH_2=\underset{COOC_{10}H_{21}}{\overset{CH_3}{C}}$$

CH: Cyclohexyl methacrylate

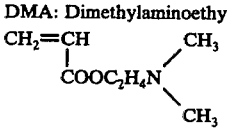

2-EHMA: 2-Ethylhexyl methacrylate

TABLE 3-continued

| Ex. (or Comparative Ex.)No. | Water Solubility | Antistatic Property | Continuous Operation | Transferring of Ink | Adhesive Properties | Total Evaluation |
|---|---|---|---|---|---|---|

$$CH_2=\underset{\underset{COOC_8H_{17}}{|}}{\overset{\overset{CH_3}{|}}{C}}$$

NVP: N-vinylpyrrolidone

Evaluation Standards
Water solubility: The absorbance of a 1.5% aqueous solution at 420 mμ was measured using a glass cell of 10 cm wide
o: less than 0.1
φ: 0.1 to 0.2
Δ: 0.2 to 0.5
x: greater than 0.5

Antistatic property, continuous operation (durability of offset printing), transferring of ink and adhesive properties were the same as defined in Example 1.

It will be apparent from the foregoing results of Table 4 that:

(1) if the amount of component (1) is less than about 25% by weight, the water solubility of the copolymer as a coating material becomes poor and also the antistatic property after coating becomes poor, as shown by Comparative Examples 15, 16 and 17;

(2) if the amount of component (1) is greater than about 35% by weight, continuous operation and the ink transfer properties deteriorate, as shown by Comparative Examples 2, 3 and 9;

(3) if the amount of component (2) is less than about 30% by weight, the copolymer is poor for continuous operation and the ink transfer properties deteriorate, as shown by Comparative Examples 1, 5, 8, 10, 11, 12, 13 and 14; and (4) if the amount of component (2) is greater than about 45% by weight, the copolymer shows poor water solubility, as shown by Comparative Examples 6 and 7.

The various properties of the resulting coated film were then evaluated in comparison with those coated with the conventional processing agents. The results shown in Table 4 below indicate that the surface processing agent of the present invention is an excellent antistatic agent for a high filler-content polypropylene film. The symbols "o", "x" and "Δ" used in the Table have the same meanings as those used in Example 1.

While the invention has been described in detail and with reference to specific embodiments thereof, it will be apparent to one skilled in the art that various changes and modifications can be made therein without departing from the spirit and scope thereof.

What is claimed is:

1. A synthetic paper comprising a paper-like synthetic resin film or sheet having coated on at least one surface thereof an N-ampho-ionized copolymer treated with a monohaloacetic acid salt, said copolymer comprising:

(1) about 25 to about 35% by weight of a monomer represented by general formula (I):

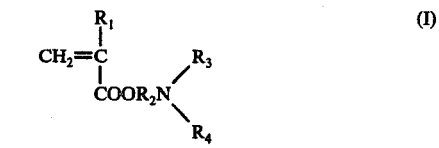

wherein $R_1$ is a hydrogen atom or a methyl group, $R_2$ is an alkylene group having 1 to 4 carbon atoms and $R_3$ and $R_4$ are each an alkyl group having 1 to 4 carbon atoms;

(2) about 30 to about 45% by weight of a monomer represented by general formula (II):

wherein $R_1$ is the same as defined above and $R_5$ is an alkyl group having 12 to 18 carbon atoms;

(3) 0 to about 15% by weight of a hydrophilic monomer; and (4) the balance of the copolymer comprising a copolymerizable hydrophobic monomer different from components (1) to (3), wherein the total amount of components (1) and (3) is not less than about 30% by weight.

2. The synthetic paper as claimed in claim 1, wherein said monohaloacetic acid salt is selected from the group consisting of an alkali metal salt, an alkaline earth metal salt and an organic amine salt.

3. The synthetic paper as claimed in claim 1, wherein component (2) is selected from the group consisting of dodecyl methacrylate, tridecyl methacrylate, myristyl methacrylate, hexadecyl methacrylate, stearyl methacrylate and mixtures thereof.

TABLE 4

| Antistatic Agents | Antistatic Properties | | | Adhesion to Substrate | Heat Resistance | Remarks |
|---|---|---|---|---|---|---|
| | Surface Resistance (Ω) | Quick Effect | Durability | | | |
| Conventional Antistatic Agents | | | | | | |
| Molecular type antistatic agent for kneading-in | 2 × 10¹² < | x | Δ | | | 1* |
| Molecular type antistatic agent for surface coating | | Δ − o | x | | | |
| Polymer type antistatic agent for surface coating | | | | | | |
| nonionic | 2 × 10¹² < | Δ⁻ | o | Δ | o | |
| anionic | 2 × 10¹² < | Δ⁺ | o | Δ | Δ | |
| cationic | 1 × 10¹¹ < | o | o | Δ | x | |
| Antistatic Agent of the Present Invention | 5 × 10¹⁰ | o | o | o | o | 2* |

1* Satisfactory results were not obtained even if 3% by weight of the agent is blended into the filler containing polymer. It appears that the antistatic agent does not bleed onto the surface of the film by being adsorbed by the filler in the polymer.
2* Satisfactory antistatic properties were obtained by coating the film in an amount of 0.1% by weight of the agent.

4. The synthetic paper as claimed in claim 1, wherein $R_2$ in the monomer of general formula (I) is an ethylene group.

5. The synthetic paper as claimed in claim 4, wherein component (1) is selected from the group consisting of dimethylaminoethyl methacrylate, diethylaminoethyl methacrylate, diethylaminoethyl acrylate, dibutylaminoethyl methacrylate, dibutylaminopropyl methacrylate and mixtures thereof.

6. The synthetic paper as claimed in claim 1, wherein component (3) is a hydrophilic monomer having a solubility at 20° C of at least about 5% by weight.

7. The synthetic paper as claimed in claim 6, wherein component (3) is selected from the group consisting of hydroxyethyl methacrylate, hydroxyethyl acrylate, hydroxypropyl acrylate, N-vinyl pyrrolidone, acrylic acid, methacrylic acid, an alkali metal salt, an amine salt or an acid-amide of methacrylic acid or acrylic acid and mixtures thereof.

8. The synthetic paper as claimed in claim 1, wherein component (4) is a polymerizable hydrophobic vinyl monomer which is insoluble or sparingly soluble in water.

9. The synthetic paper as claimed in claim 8, wherein component (4) is selected from the group consisting of styrene, vinyl toluene, chlorostyrene, α-methylstyrene, 2-ethylhexyl methacrylate, cyclohexyl methacrylate and mixtures thereof.

* * * * *